US012774165B2

(12) United States Patent
Kawasaki et al.

(10) Patent No.: US 12,774,165 B2
(45) Date of Patent: Oct. 27, 2026

(54) CONVEYING DEVICE

(71) Applicant: KYOCERA Document Solutions Inc., Osaka (JP)

(72) Inventors: Kenichiro Kawasaki, Osaka (JP); Nobuyuki Hayashi, Osaka (JP); Takeshi Watanabe, Osaka (JP); Yutaka Betto, Osaka (JP); Akihisa Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/247,379

(22) Filed: Jun. 24, 2025

(65) Prior Publication Data

US 2026/0008626 A1 Jan. 8, 2026

(30) Foreign Application Priority Data

Jul. 2, 2024 (JP) ................................ 2024-106986

(51) Int. Cl.

| | |
|---|---|
| ***B65G 23/04*** | (2006.01) |
| ***B41J 11/00*** | (2006.01) |
| ***B65H 5/00*** | (2006.01) |
| ***B65H 5/02*** | (2006.01) |

(52) U.S. Cl.

CPC ............. *B65G 23/04* (2013.01); *B41J 11/007* (2013.01); *B65H 5/004* (2013.01); *B65H 5/021* (2013.01)

(58) Field of Classification Search

CPC ........ B65G 23/04; B65H 5/004; B65H 5/021; B41J 11/007

See application file for complete search history.

(56) References Cited

U.S. PATENT DOCUMENTS

| | | | | |
|---|---|---|---|---|
| 7,591,458 B2 * | 9/2009 | Maki | B65H 5/004 271/18.1 |
| 8,752,955 B2 * | 6/2014 | Kobayashi | B41J 11/007 271/193 |
| 2010/0118097 A1 * | 5/2010 | Ichinose | B41J 13/08 271/264 |
| 2012/0098912 A1 * | 4/2012 | Kaneko | B41J 13/223 271/18.1 |
| 2013/0001869 A1 * | 1/2013 | Ujiie | B65H 29/56 271/225 |
| 2013/0113869 A1 * | 5/2013 | Kobayashi | B41J 11/007 347/104 |
| 2015/0070456 A1 * | 3/2015 | Imoto | B65H 29/60 271/18.1 |
| 2016/0246244 A1 * | 8/2016 | Mori | B41J 15/048 |
| 2018/0326754 A1 * | 11/2018 | Young | B65H 5/004 |
| 2020/0023603 A1 | 1/2020 | Akita et al. | |

FOREIGN PATENT DOCUMENTS

JP 2018-127351 A 8/2018

* cited by examiner

*Primary Examiner* — James R Bidwell

(74) *Attorney, Agent, or Firm* — Studebaker Brackett PLLC

(57) ABSTRACT

A conveying device includes an endless conveyance belt and a drive source, and a charging roller. The drive source drives the conveyance belt. The charging roller applies an AC voltage to the conveyance belt. A peripheral length of the charging roller is (2N+1) times (N is an integer greater than or equal to 1) a half-cycle length which is a width of a charged region of the conveyance belt corresponding to a half-cycle of the AC voltage.

3 Claims, 2 Drawing Sheets

CONVEYING DEVICE

INCORPORATION BY REFERENCE

This application is based on and claims the benefit of priority from Japanese patent application No. 2024-106986 filed on Jul. 2, 2024 which is incorporated by reference in its entirety.

BACKGROUND

The present disclosure relates to a conveying device.

There is known a conveying device in which a sheet is attracted to a charged conveyance belt. Such a conveyance device may be provided with a charging roller which is in contact with the conveyance belt and applies an AC voltage. By alternately charging the conveyance belt positively and negatively in the conveyance direction, it is possible to obtain a higher attraction force than when the conveyance belt is charged in a single polarity.

In order to obtain a high attraction force in the above-described configuration, it is necessary to shorten a width of the positively and negatively charged regions of the conveyance belt, that is a width of the charged region of the conveyance belt corresponding to the half cycle of the AC voltage, (hereinafter referred to as half-cycle length) to some extent, and therefore, it is necessary to change the polarity of the voltage a plurality of times during one rotation of the charging roller. Focusing on the relationship between the peripheral length of the charging roller and the half-cycle length, when the peripheral length of the charging roller is an even multiple of the half-cycle length, the direction of the electric field applied to the rubber layer of the charging roller is fixed, so that the distribution of the conductive material in the rubber layer is biased, and the charge applying ability to the conveyance belt is lowered.

SUMMARY

A conveying device according to the present disclosure includes an endless conveyance belt and a drive source, and a charging roller. The drive source drives the conveyance belt. The charging roller applies an AC voltage to the conveyance belt. A peripheral length of the charging roller is (2N+1) times (N is an integer greater than or equal to 1) a half-cycle length which is a width of a charged region of the conveyance belt corresponding to a half-cycle of the AC voltage.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, a conveying device 1 according to an embodiment of the present disclosure will be described.

Figure 1:
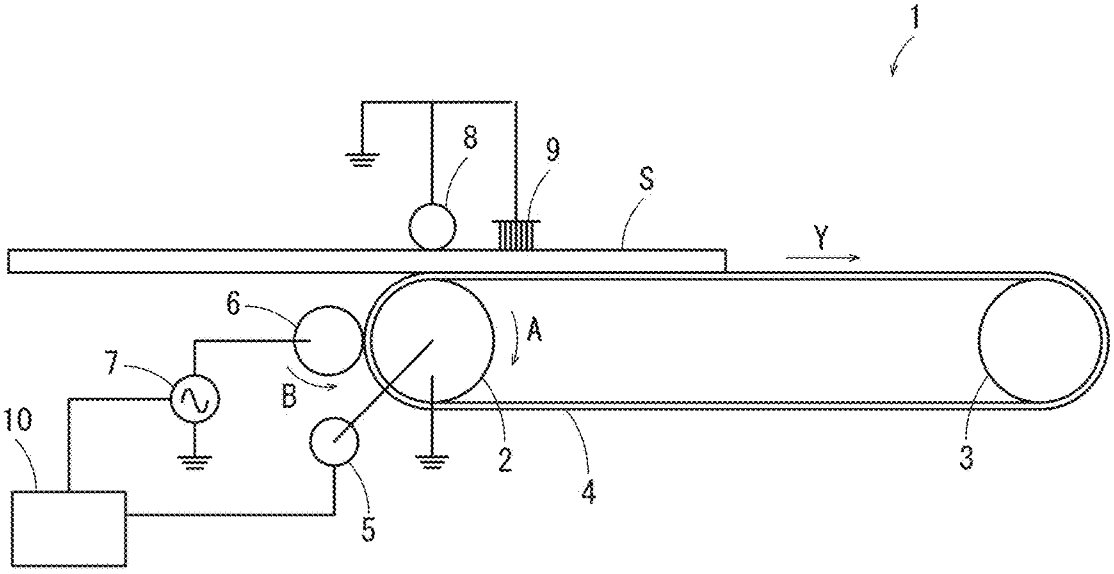
FIG. 1 is a front view schematically showing a conveying device according to one embodiment of the present disclosure.

FIG. 1 is a front view schematically showing the conveying device 1. The conveying device 1 is disposed below an inkjet head (not shown), for example, and conveys the sheet S in a predetermined conveyance direction Y. The conveying device 1 includes an endless conveyance belt 4 and a charging roller 6 which applies an AC voltage to the conveyance belt 4.

The conveyance belt 4 is wound around a driving roller 2 and a driven roller 3. The driving roller 2 is driven in the A direction by a drive source 5 such as a motor. A charging roller 6 is pressed against the driving roller 2 via the conveyance belt 4. The charging roller 6 is rotated in the direction B together with the conveyance belt 4 by frictional resistance with the conveyance belt 4. The charging roller 6 has a rubber layer in which conductive particles are dispersed (not shown). An AC voltage is applied to the charging roller 6 from a power source 7. A control part 10 controls the drive source 5 and the power source 7. A pressing roller 8 is provided above the driving roller 2. The pressing roller 8 is biased downward to press the sheet S against the conveyance belt 4. A static elimination brush 9 is in contact with the sheet S to be conveyed and eliminates the charge of the sheet S.

In this embodiment, it is assumed that the conveyance belt 4 is driven intermittently. For example, in the case of a serial type inkjet recording apparatus (not shown) in which the inkjet head is reciprocated in the width direction crossing the conveyance direction Y, the ink is ejected while the inkjet head is moved in one of the width directions while the conveyance of the sheet S is stopped. When the inkjet head reaches the end point in the width direction, the inkjet head returns to the start point. Subsequently, the sheet S conveyed by a predetermined distance and stopped, and the inkjet head ejects the ink while moving in one direction. By repeating this operation, an image is formed on the sheet S.

Figure 2:
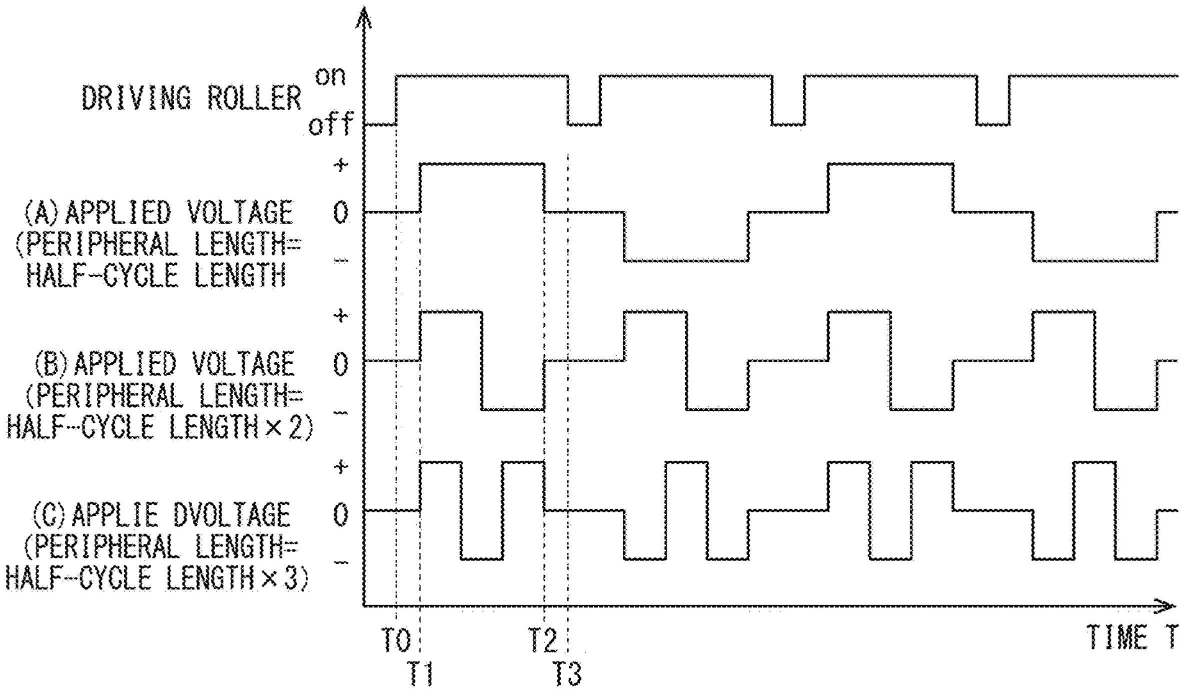
FIG. 2 is a sequence diagram showing control signals for controlling a driving roller and a charging roller according to the embodiment of the present disclosure.

FIG. 2 is a sequence diagram showing control signals for controlling the driving roller 2 and the charging roller 6. The control signal to the driving roller 2 intermittently repeats ON (T=T0) and OFF (T=T3). Thus, the conveyance belt 4 is intermittently driven. The start of application of the voltage to the charging roller 6 (T=T1) is slightly delayed from the ON of the driving roller 2. The end of application of the voltage to the charging roller 6 (T=T2) is slightly earlier than the OFF of the driving roller 2.

Figure 3:
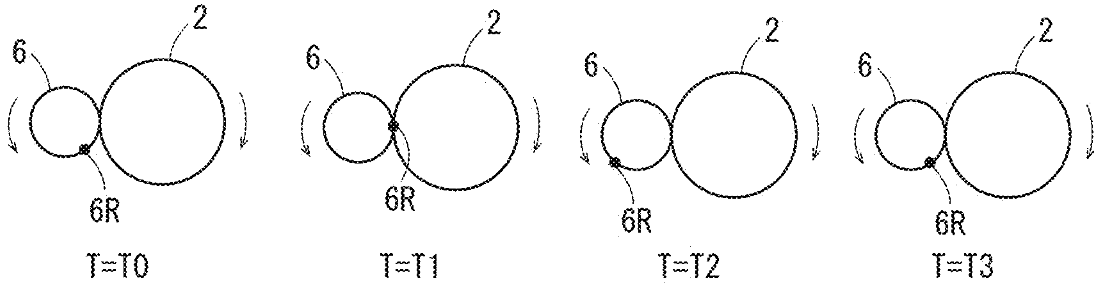
FIG. 3 is a view showing a movement of a reference point on the outer peripheral surface of the charging roller at each timing according to the embodiment of the present disclosure.

FIG. 3 is a view showing the movement of the reference point 6R on the outer peripheral surface of the charging roller 6 at each timing (the conveyance belt 4 is not shown). The charging roller 6 rotates once between ON (T=T0) and OFF (T=T3) of the driving roller 2.

Here, the relationship between the width of the positively and negatively charged region of the conveyance belt 4, that is, the width of the charged region of the conveyance belt 4 corresponding to the half cycle of the AC voltage (hereinafter referred to as a half-cycle length), and the peripheral length of the charging roller 6 will be described.

(A) in FIG. 2 shows the control signal when the peripheral length is equal to the half-cycle length. In this case, the voltage of either positive or negative polarity is applied during the period from ON to OFF of the driving roller 2 (that is, during one rotation of the charging roller 6). Since the direction of the electric field applied to the charging roller 6 is reversed every one rotation, the distribution of the conductive material in the rubber layer is hardly biased. However, since the half-cycle length is longer, the attraction force is not improved. To further improve the attraction force, it is necessary to shorten the half-cycle length.

(B) in FIG. 2 shows the control signal when the peripheral length is twice the half-cycle length. In this case, the polarity of the voltage is reversed between the first ½ rotation of the charging roller 6 and the subsequent ½ rotation, but the direction of the electric field applied to the charging roller 6 is fixed, and therefore, the distribution of the conductive material in the rubber layer is biased.

Figure 4:
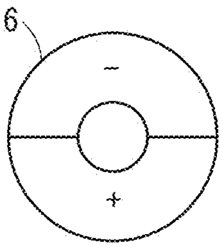
FIG. 4 is a view showing a polarity distribution of the charging roller according to the embodiment of the present disclosure.

FIG. 4 is a view showing the distribution of the polarity of the charging roller 6. This figure shows the distribution of the electric field applied to the charging roller 6 during one rotation of the charging roller 6 with reference to the time point T=T1. While the charging roller 6 rotates ½ from T=T1, the region in contact with the conveyance belt 4 is positively charged, and thereafter, while the charging roller 6 rotates ½, the region in contact with the conveyance belt 4 is negatively charged. When the peripheral length is 2N times the half-cycle length (N is an integer greater than or equal to 1), the same phenomenon as in the case of the twice occurs at a cycle corresponding to N.

(C) in FIG. 2 shows the control signal when the peripheral length is three times the half-cycle length. In this case, the polarity of the voltage changes every time the charging roller 6 rotates by ⅓.

Figure 5:
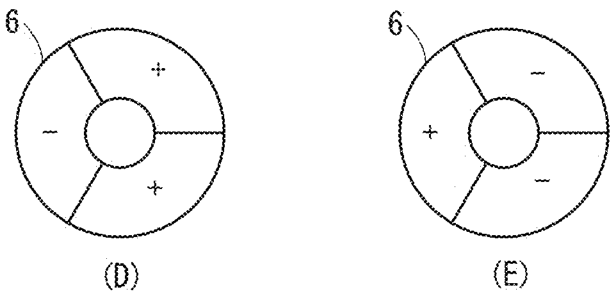
FIG. 5 is a view showing the polarity distribution of the charging roller according to the embodiment of the present disclosure.

FIG. 5 is a view showing the distribution of the polarity of the charging roller 6. In the first rotation (see (D) in FIG. 5), the region in contact with the conveyance belt 4 is positively charged during the ⅓ rotation of the charging roller 6 from T=T1, then the region in contact with the conveyance belt 4 is negatively charged during the ⅓ rotation of the charging roller 6, and then the region in contact with the conveyance belt 4 is positively charged during the ⅓ rotation of the charging roller 6.

On the other hand, in the next one rotation (see (E) in FIG. 5), the region in contact with the conveyance belt 4 is negatively charged while the charging roller 6 rotates ⅓ from T=T1, then the region in contact with the conveyance belt 4 is positively charged while the charging roller 6 rotates by ⅓, and then the region in contact with the conveyance belt 4 is negatively charged while the charging roller rotates by ⅓. As described above, the direction of the electric field applied to the rubber layer of the charging roller 6 is reversed every time one rotation, so that the distribution of the conductive material in the rubber layer is hardly biased. When the peripheral length is (2N+1) times the half-cycle length (N is an integer greater than or equal to 1), the same phenomenon as that in the case of three times occurs at a cycle corresponding to N.

The conveying device 1 according to the present embodiment described above includes the endless conveyance belt 4, the drive source 5 which drives the conveyance belt 4, and the charging roller 6 which applies an AC voltage to the conveyance belt 4, wherein the peripheral length of the charging roller 6 is (2N+1) times the half-cycle length (N is an integer greater than or equal to 1), which is the width of the charging region of the conveyance belt 4 corresponding to the half-cycle of the AC voltage. According to the present embodiment, the direction of the electric field applied to the rubber layer of the charging roller 6 for applying the AC voltage to the conveyance belt 4 can be prevented from being fixed.

Further, according to the conveying device 1 according to the present embodiment, the drive source 5 intermittently drives the conveyance belt 4, and each time the drive source 5 drives the conveyance belt 4 once, the charging roller 6 rotates once. According to this embodiment, even when the conveyance belt 4 is driven intermittently, the direction of the electric field applied to the rubber layer of the charging roller 6 can be prevented from being fixed.

The above embodiments may be modified as follows.

In addition to the configuration of the above embodiment, the control part 10 may perform the following control. The conveying device 1 includes the power source 7 which applies the AC voltage to the charging roller 6, and the control part 10 which controls the drive source 5 and the power source 7. When the rotation speed of the conveyance belt 4 by the drive source 5 is changed, the control part 10 changes the cycle of the AC power applied by the power source 7 in accordance with the rotation speed. For example, the control part 10 lowers the rotation speed of the conveyance belt 4 when the density of the image is greater than or equal to a threshold value or when the sheet S thicker than usual is used. In this case, the control part 10 lengthens the cycle of current power in accordance with the rate of lowering of the rotation speed. According to this embodiment, the direction of the electric field applied to the rubber layer can be prevented from being fixed even when the rotation speed of the conveyance belt 4 is changed.

In the above-described embodiment, an example in which the conveyance belt 4 is intermittently driven is shown, but the present disclosure is also applicable to a configuration in which the conveyance belt 4 is continuously driven during execution of one image forming job.

The invention claimed is:

1. A conveying device comprising:

an endless conveyance belt;

a drive source which drives the conveyance belt; and a charging roller which applies an AC voltage to the conveyance belt, wherein a peripheral length of the charging roller is (2N+1) times (N is an integer greater than or equal to 1) a half-cycle length which is a width of a charged region of the conveyance belt corresponding to a half-cycle of the AC voltage.

2. The conveying device according to claim 1, wherein the drive source intermittently drives the conveyance belt, and the charging roller rotates once each time the drive source drives the conveyance belt once.

3. The conveying device according to claim 1, comprising:

a power source which applies the AC voltage to the charging roller, and a control part which controls the drive source and the power source, wherein the control part changes a cycle of the AC voltage applied by the power source according to a rotation speed when the rotation speed of the conveyance belt by the drive source is changed.

* * * * *